US012176633B2

(12) United States Patent
Park et al.

(10) Patent No.: US 12,176,633 B2
(45) Date of Patent: Dec. 24, 2024

(54) ANTENNA DEVICE

(71) Applicant: Samsung Electro-Mechanics Co., Ltd., Suwon-si (KR)

(72) Inventors: Juhyoung Park, Suwon-si (KR); Daeki Lim, Suwon-si (KR); Won Cheol Lee, Suwon-si (KR); Jeongki Ryoo, Suwon-si (KR); Sungyong An, Suwon-si (KR); Chin Mo Kim, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 244 days.

(21) Appl. No.: 17/980,203

(22) Filed: Nov. 3, 2022

(65) Prior Publication Data

US 2023/0216202 A1 Jul. 6, 2023

(30) Foreign Application Priority Data

Dec. 31, 2021 (KR) ........................ 10-2021-0194181

(51) Int. Cl.

*H01Q 9/04* (2006.01)
*H01Q 5/307* (2015.01)
*H01Q 21/08* (2006.01)

(52) U.S. Cl.

CPC ........... *H01Q 9/0414* (2013.01); *H01Q 5/307* (2015.01); *H01Q 9/045* (2013.01); *H01Q 21/08* (2013.01)

(58) Field of Classification Search

None

See application file for complete search history.

(56) References Cited

U.S. PATENT DOCUMENTS

| | | | | |
|---|---|---|---|---|
| 6,556,169 | B1 | 4/2003 | Fukuura et al. | |
| 11,894,614 | B2 * | 2/2024 | So | H01Q 21/08 |
| 2022/0320020 | A1 * | 10/2022 | Hsu | H01L 23/5384 |
| 2023/0072031 | A1 * | 3/2023 | Chen | H01Q 19/10 |
| 2024/0222869 | A1 * | 7/2024 | Fang | H01Q 1/38 |
| 2024/0222880 | A1 * | 7/2024 | Yang | H01Q 1/38 |

FOREIGN PATENT DOCUMENTS

| | | | |
|---|---|---|---|
| JP | 2019-9544 | A | 1/2019 |
| KR | 10-1014352 | B1 | 2/2022 |

* cited by examiner

*Primary Examiner* — Wilson Lee

(74) *Attorney, Agent, or Firm* — NSIP Law

(57) ABSTRACT

An antenna device according to embodiment includes: a first dielectric layer; a second dielectric layer disposed on the first dielectric layer; a third dielectric layer disposed on the second dielectric layer; a first antenna including a first feed via passing through the first dielectric layer and a first antenna patch disposed in a first surface of the first dielectric layer; and a second antenna including a second feed via passing through the first dielectric layer and a second antenna patch disposed in the first surface of the first dielectric layer, wherein a dielectric constant of the second dielectric layer is lower than a dielectric constant of the first dielectric layer and a dielectric constant of the third dielectric layer, and the second dielectric layer has a cavity overlapping the second antenna patch.

20 Claims, 12 Drawing Sheets

ANTENNA DEVICE

CROSS-REFERENCE TO RELATED APPLICATION

This application claims the benefit under 35 USC 119(a) of Korean Patent Application No. 10-2021-0194181 filed in the Korean Intellectual Property Office on Dec. 31, 2021, the entire disclosure of which are incorporated herein by reference for all purposes.

BACKGROUND

1. Field

The present disclosure relates to a multi-band antenna device.

2. Description of the Related Art

The development of wireless communication systems has greatly changed our lifestyles over the past 20 years. An advanced mobile system with a gigabit per second data speed may be desired to support potential wireless applications such as multimedia devices, the Internet of Things, and intelligent transportation systems.

In a case of 5G communication, the frequency bands allocated for each country are different, and in some countries more than two bands are used, so the need for a multi-band antenna that may transmit and receive RF signals of multiple bands with one antenna is increasing.

When the multi-band antennas are stacked and formed in the height direction, the vertical structure of the antenna becomes complicated, and when forming the antenna, it may be desired to stack a plurality of dielectric layers and form a plurality of vias in a plurality of dielectric layers, thereby complicating the manufacturing process and increasing the manufacturing cost.

In addition, the multi-band antennas may be formed by dividing a low-band antenna and a high-band antenna and arranged them in the horizontal direction, however, as the low-band antenna and the high-band antenna are formed through different manufacturing processes, the manufacturing process becomes complicated and manufacturing costs may be high.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, an antenna device includes: a first dielectric layer; a second dielectric layer disposed on the first dielectric layer; a third dielectric layer disposed on the second dielectric layer; a first antenna including a first feed via passing through the first dielectric layer and a first antenna patch disposed on a first surface of the first dielectric layer; and a second antenna including a second feed via passing through the first dielectric layer and a second antenna patch disposed on the first surface of the first dielectric layer, wherein the dielectric constant of the second dielectric layer is lower than the dielectric constant of the first dielectric layer and the dielectric constant of the third dielectric layer, and the second dielectric layer has a cavity overlapping the second antenna patch.

The dielectric constant of the third dielectric layer may be higher than the dielectric constant of the first dielectric layer.

The second dielectric layer may include an adhesive material.

The second dielectric layer may include a polymer.

The thickness of the second dielectric layer may be smaller than the thickness of the first dielectric layer and the thickness of the third dielectric layer.

The first antenna may further include a third antenna patch overlapping the first antenna patch, and the third antenna patch may be disposed on a first surface of the third dielectric layer, and the first surface of the first dielectric layer and the first surface of the third dielectric layer may face each other with the second dielectric layer interposed therebetween.

The first antenna may further include a fourth antenna patch overlapping the first antenna patch, and the fourth antenna patch may be disposed on a second surface of the third dielectric layer opposing the first surface of the third dielectric layer.

The area of the third antenna patch and the area of the fourth antenna patch may be smaller than the area of the first antenna patch.

The area of the third antenna patch may be smaller than the area of the fourth antenna patch.

The area of the third antenna patch may be smaller than the area of the second antenna patch.

The first antenna may be configured to transmit and receive an RF signal of the first bandwidth, and the second antenna may be configured to transmit and receive an RF signal of a second bandwidth higher than the first bandwidth.

The antenna device may further include a plurality of connections disposed on a second surface of the first dielectric layer opposing the first surface of the first dielectric layer.

In another general aspect, an antenna device includes: a first antenna including a first dielectric layer and a second dielectric layer, a third dielectric layer disposed between the first dielectric layer and the second dielectric layer, a first feed via passing through the first dielectric layer, a first feed patch disposed on the first dielectric layer, and a radiating patch disposed in the second dielectric layer; and a second antenna including the first dielectric layer, the second dielectric layer, a second feed via passing through the first dielectric layer, a second feed patch disposed on the first dielectric layer, and a cavity formed in the third dielectric layer disposed on the second feed patch.

The radiating patch of the first antenna may include: a first radiating patch disposed in the first surface of the second dielectric layer and facing the first feed patch via the third dielectric layer therebetween; and a second radiating patch disposed in the second surface facing the first surface of the second dielectric layer.

A size of the first radiating patch may be smaller than a size of the first feed patch and a size of the second radiating patch.

A size of the first feed patch may be larger than a size of the second feed patch.

The antenna device may further include a plurality of connections disposed under the first dielectric layer.

Other features and aspects will be apparent from the following detailed description, the drawings, and the claims.

BRIEF DESCRIPTION OF THE DRAWINGS

Throughout the drawings and the detailed description, the same reference numerals refer to the same or like elements. The drawings may not be to scale, and the relative size, proportions, and depiction of elements in the drawings may be exaggerated for clarity, illustration, and convenience.

DETAILED DESCRIPTION

Figure 1:
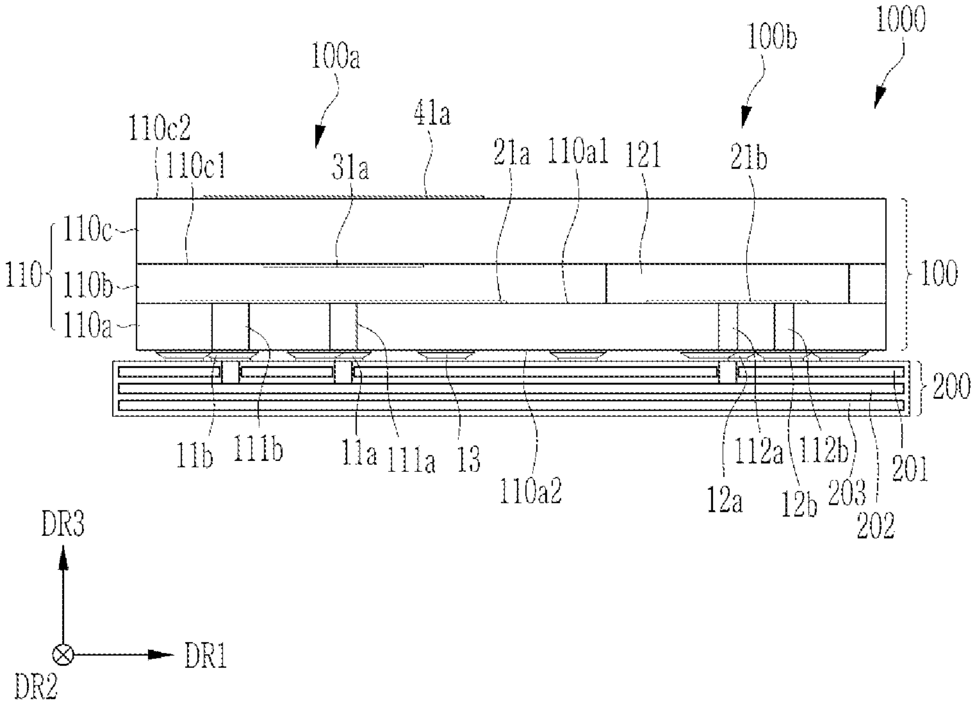
FIG. 1 is a cross-sectional view of an antenna device according to an embodiment.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after understanding of the disclosure of this application may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes shown in the drawings may occur. Thus, the examples described herein are not limited to the specific shapes shown in the drawings, but include changes in shape that occur during manufacturing.

The features of the examples described herein may be combined in various ways as will be apparent after an understanding of the disclosure of this application. Further, although the examples described herein have a variety of configurations, other configurations are possible as will be apparent after an understanding of the disclosure of this application.

Further, in this specification, the phrase "on a plane" means viewing a target portion from the top, and the phrase "on a cross-section" means viewing a cross-section formed by vertically cutting a target portion from the side.

In addition, in the specification, when referring to "connected to", this does not only mean that two or more constituent elements are directly connected to, but also that two or more constituent elements are electrically connected through other constituent elements as well as being indirectly connected to and being physically connected to, or it may mean that they are referred to by different names according to a position or function, but are integrated.

Throughout the specification, a pattern, a via, a plane, a line, and an electrical connection structure may include metal materials (e.g., conductive materials such as copper (Cu), aluminum (Al), silver (Ag), tin (Sn), gold (Au), nickel (Ni), lead (Pb), titanium (Ti), or alloys thereof), and may be formed according to a plating method such as CVD (chemical vapor deposition), PVD (Physical Vapor Deposition), sputtering, a subtractive method, an additive method, an SAP (Semi-Additive Process), and an MSAP (Modified Semi-Additive Process).

Throughout the specification, the dielectric layer and/or insulation layer is may be implemented with FR4, an LCP (Liquid Crystal Polymer), an LTCC (Low Temperature Co-fired Ceramic), a thermosetting resin such as an epoxy resin, a thermal baking resin such as a polyimide, or a resin in which these resins are impregnated into a core material such as glass fiber, glass cloth, and glass fabric along with inorganic fillers, a prepreg, an Ajinomoto build-up film (ABF), FR-4, BT (Bismaleimide Triazine), a photosensitive insulating (PhotoImageable Dielectric: PID) resin, a general copper clad laminate (CCL), or a glass or ceramic (ceramic)-based insulating material.

Throughout the specification, the RF signal may have a format according to Wi-Fi (IEEE 802.11 family, etc.), WiMAX (IEEE 802.16 family, etc.), IEEE 802.20, LTE (long term evolution), Ev-DO, HSPA, HSDPA, HSUPA, EDGE, GSM, GPS, GPRS, CDMA, TDMA, DECT, Bluetooth, 3G, 4G, 5G, and other arbitrary wireless and wired protocols designated later, but is not limited thereto.

Hereinafter, various embodiments and variations are described in detail with reference to accompanying drawings.

An antenna device 1000, according to an embodiment, is described with reference to FIG. 1 and FIG. 2. FIG. 1 is a cross-sectional view of an antenna device according to an embodiment, and FIG. 2 is a top plan view of an antenna device of FIG. 1.

Figure 2:
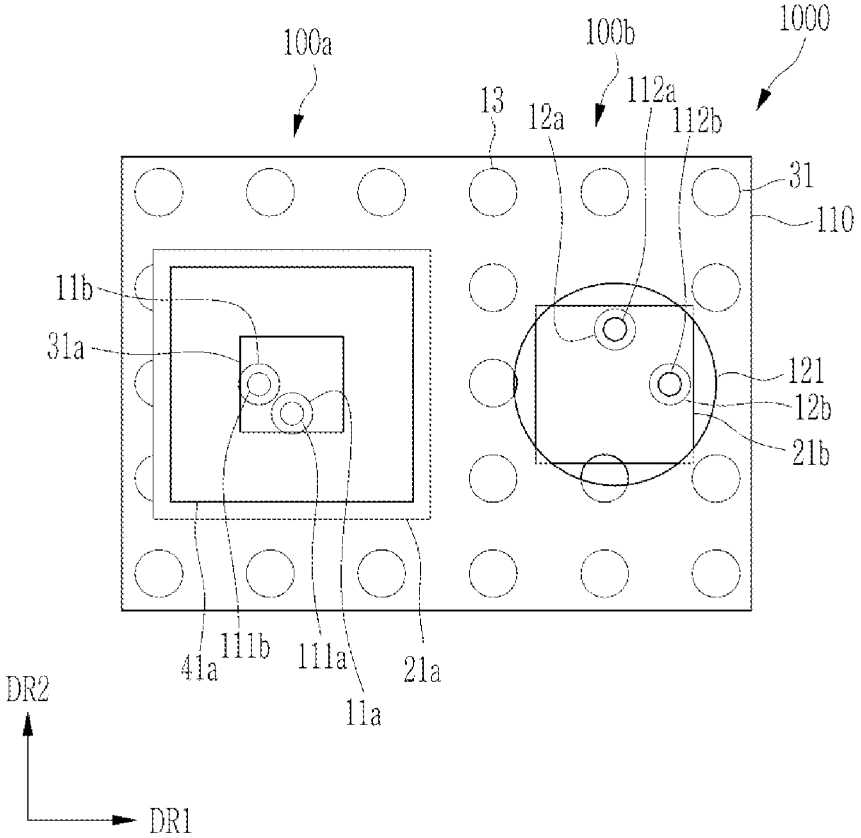
FIG. 2 is a top plan view of an antenna device of FIG. 1.

Referring to FIG. 1 and FIG. 2, the antenna device 1000, according to the present embodiment, includes an antenna 100 formed of one chip, and the antenna 100 includes a first antenna 100*a* and a second antenna 100*b*.

The first antenna 100*a* and the second antenna 100*b* may include a dielectric layer 110, feed vias 111*a*, 111*b*, 112*a*, and 112*b*, and antenna patches 21*a*, 21*b*, 31*a*, and 41*a* disposed at the dielectric layer 110, and connections 11*a*, 11*b*, 12*a*, 12*b*, and 13 disposed under the dielectric layer 110.

The first antenna 100*a* and the second antenna 100*b* of the antenna 100 may be disposed on the sides of each other along the first direction DR1.

The dielectric layer 110 of the first antenna 100*a* and the second antenna 100*b* may include a first dielectric layer 110*a*, a second dielectric layer 110*b*, and a third dielectric layer 110*c* extending in the first direction DR1 and the second direction DR2, and sequentially disposed along a third direction DR3 perpendicular to the first direction DR1 and the second direction DR2.

Dielectric constants of the first dielectric layer 110*a*, the second dielectric layer 110*b*, and the third dielectric layer 110*c* may differ. For example, the dielectric constant of the first dielectric layer 110*a* and the third dielectric layer 110*c* may be larger than the dielectric constant of the second dielectric layer 110*b* disposed between the first dielectric layer 110*a* and the third dielectric layer 110*c*, and the dielectric constant of the third dielectric layer 110*c* may be larger than the dielectric constant of the first dielectric layer 110*a*.

The second dielectric layer 110*b* may include a different material from a material of the first dielectric layer 110*a* and the third dielectric layer 110*c*. For example, the second dielectric layer 110*b* may have adhesiveness to increase the bonding force between the first dielectric layer 110*a* and the third dielectric layer 110*c*. For example, the second dielectric layer 110*b* may include a ceramic material having a lower dielectric constant than that of the first dielectric layer 110*a* and the third dielectric layer 110*c*, or may have high flexibility such as an LCP (Liquid Crystal Polymer) or a polyimide, or may include a material such as an epoxy resin or Teflon to have strong durability and high adhesion, while the second dielectric layer 110*b* may include a polymer having adhesive properties.

The thickness of the first dielectric layer 110*a* and the third dielectric layer 110*c* may be greater than the thickness of the second dielectric layer 110*b*.

The first dielectric layer 110*a* may have a first surface 110*a*1 and a second surface 110*a*2 facing each other along the third direction DR3, and the third dielectric layer 110*c* may have a first surface 110*c*1 and a second surface 110*c*2 facing each other along the third direction DR3, while the first surface 110*a*1 of the first dielectric layer 110*a* may face the first surface 110*c*1 of the third dielectric layer 110*c*.

The first antenna 100*a* may include the first feed via 111*a* and the second feed via 111*b* penetrating the first dielectric layer 110*a*, the first antenna patch 21*a* disposed at the first surface 110*a*1 of the first dielectric layer 110*a*, the second antenna patch 31*a* facing the first antenna patch 21*a* and disposed at the first surface 110*c*1 of the third dielectric layer 110*c*, and the third antenna patch 41*a* disposed at the second surface 110*c*2 of the third dielectric layer 110*c* and overlapping the first antenna patch 21*a* and the second antenna patch 31*a* along the third direction DR3.

The first antenna patch 21*a*, the second antenna patch 31*a*, and the third antenna patch 41*a* may include a metal layer of a flat polygonal plate shape having a constant area. For example, the first antenna patch 21*a*, the second antenna patch 31*a*, and the third antenna patch 41*a* may have a quadrangle shape, but are not limited thereto, and the first antenna patch 21*a*, the second antenna patch 31*a*, and the third antenna patch 41*a* may have a polygon shape, or various shapes such as a circle shape.

The first antenna patch 21*a* may be fed from the first feed via 111*a* and the second feed via 111*b*. The first antenna patch 21*a* may be a feed patch.

The second antenna patch 31*a* and third antenna patch 41*a* are spaced apart along the third direction DR3, and the second antenna patch 31*a* and third antenna patch 41*a* may have a same or different area as the first antenna patch 21*a*. For example, the second antenna patch 31*a* and the third antenna patch 41*a* may have a smaller area than the first antenna patch 21*a*, and the second antenna patch 31*a* may have a smaller area than the third antenna patch 41*a*. In addition, the second antenna patch 31*a* may have a smaller area than the fourth antenna patch 21*b* of the second antenna 100*b*, to be described later.

The second antenna patch 31*a* and the third antenna patch 41*a* may be electromagnetically coupled to the first antenna patch 21*a*, and may be radiating patches. The second antenna patch 31*a* and third antenna patch 41*a* may improve the gain or bandwidth of the first antenna patch 21*a* by focusing the RF signal in the third direction DR3.

The second antenna 100*b* may include a third feed via 112*a* and a fourth feed via 112*b* passing through the first dielectric layer 110*a*, and a fourth antenna patch 21*b* disposed on the first surface 110*a*1 of the first dielectric layer 110*a*.

The second dielectric layer 110*b* may have a first cavity 121 overlapping the fourth antenna patch 21*b* of the second antenna 100*b*. The first cavity 121 may be an air cavity filled with air, whereby the dielectric constant of the second dielectric layer 110*b* may be smaller than that of the first dielectric layer 110*a* and the third dielectric layer 110*c*. The length of the boundary portion between the first dielectric layer 110*a* and the second dielectric layer 110*b* having different dielectric constants may be increased by the first cavity 121.

Of the dielectric layer 110 of the second antenna 100*b*, as the second dielectric layer 110*b* having a smaller dielectric constant than the first dielectric layer 110*a* and the third dielectric layer 110*c* has the first cavity 121, a dielectric constant interface is formed between the layers having the different dielectric constants, and the radiation pattern of the second antenna 100*b* may be changed by this dielectric constant interface. In this way, the gain of the second antenna 100*b* may be increased by changing the radiation pattern of the second antenna 100*b* by adjusting the dielectric constant interface in the dielectric layer 110 of the second antenna 100*b*.

The first cavity 121 of the second dielectric layer 110*b* may have a circular planar shape, but is not limited thereto, and may have a polygonal planar shape.

In addition, by making the dielectric constant of the uppermost third dielectric layer 110*c* along the third direction DR3 larger than the dielectric constant of the first dielectric layer 110*a*, the directivity of the first antenna 100*a* and the second antenna 100*b* may be increased.

A plurality of connections 11*a*, 11*b*, 12*a*, 12*b*, and 13 may be disposed in the second surface 110*a*2 of the first dielectric layer 110*a*.

Among a plurality of connections 11*a*, 11*b*, 12*a*, 12*b*, and 13, the first connection 11*a* and the second connection 11*b* may be connected to the first feed via 111*a* and the second feed via 111*b*, and the third connection 12*a* and the fourth connection 12*b* may be connected to the third feed via 112*a* and the fourth feed via 112*b*. A plurality of fifth connections 13 may be attached to the first dielectric layer 110*a*.

A plurality of connections 11*a*, 11*b*, 12*a*, 12*b*, and 13 may have a structure such as a solder ball, a pin, a land, or a pad.

The antenna device 1000 may further include a connection substrate 200 disposed under the antenna 100, and the antenna 100 may be connected to the connection substrate 200 through a plurality of connections 11*a*, 11*b*, 12*a*, 12*b*, and 13.

The connection substrate 200 may include a ground plane 201 and a plurality of metal layers 202 and 203.

The first feed via 111*a* and the second feed via 111*b*, and the third feed via 112*a* and the fourth feed via 112*b*, may receive an electrical signal from an electronic device disposed under the connection substrate 200.

The first antenna 100*a* may be fed from the first feed via 111*a* and the second feed via 111*b* to transmit and receive the RF signal in the first band, and the second antenna 100*b* may be fed from the third feed via 112*a* and the fourth feed via 112*b* to transmit and receive the RF signals in the second band.

The first antenna 100*a* may transmit/receive a first polarized RF signal of the first bandwidth according to the electromagnetic signal fed through the first feed via 111*a*, and the first antenna 100*a* may transmit/receive a second polarized RF signal of the first bandwidth according to the electromagnetic signal fed through the second feed via 111*b*.

The second antenna 100*b* may transmit/receive the first polarized RF signal of the second bandwidth according to the electromagnetic signal fed through the third feed via 112*a*, and may transmit/receive the second polarized RF signal of the second bandwidth according to the electromagnetic signal fed through the fourth feed via 112*b*.

The center frequency of the first bandwidth may be lower than a center frequency of the second bandwidth, the first polarized wave may be a horizontally polarized wave, and the second polarized wave may be a vertically polarized wave. For example, the range of the first bandwidth may be about 24 GHz to about 30 GHz, and the range of the second bandwidth may be about 37 GHz to about 50 GHz.

Referring to FIG. 2, the first feed via 111*a* and the second feed via 111*b* may be disposed to be biased in the lower left side along the first direction DR1 and the second direction DR2 with reference to the center of the first antenna patch 21*a*, and the third feed via 112*a* and the fourth feed via 112*b* may be disposed to be biased in the upper right side along the first direction DR1 and the second direction DR2. In this way, by disposing the first feed via 111*a* and the second feed via 111*b*, and the third feed via 112*a* and the fourth feed via 112*b*, to be far apart from each other with respect to the center of the antenna 100, the degree of isolation between the first antenna 100*a* and the second antenna 100*b* may be increased.

According to the antenna device 1000 according to the present embodiment, the first antenna 100*a* and the second antenna 100*b* that transmit and receive the RF signals of the different bandwidths may be formed together to be disposed next to each other along the first direction DR1, which is the horizontal direction, by using the same dielectric layer 110, compared to a case of integrating the dual band antenna in the vertical direction, the structure of the antenna 100 is not complicated. Hence, the manufacturing process is easy compared to the case of separately forming two antennas of different bandwidths. The manufacturing process is not complicated; thus, the cost may be lowered.

According to the antenna device 1000 according to the present embodiment, the dielectric constant of the third dielectric layer 110*c* may be formed larger than the dielectric constant of the first dielectric layer 110*a* of the dielectric layer 110, and the dielectric constant of the second dielectric layer 110*b* of the dielectric layer 110 may be formed smaller than the dielectric constant of the first dielectric layer 110*a* and the third dielectric layer 110*c*. Through this, the dielectric constant of the dielectric layers disposed between the first antenna patch 21*a*, the second antenna patch 31*a*, and the third antenna patch 41*a* of the first antenna 100*a* may be changed, and the first antenna 100*a* may increase the bandwidth of the first antenna 100*a* for transmitting/receiving the RF signal of the first bandwidth by including the second antenna patch 31*a* and the third antenna patch 41*a* overlapping the first antenna patch 21*a*. The second antenna 100*b* may have the first cavity 121 at the second dielectric layer 110*b* overlapping the fourth antenna patch 21*b*, the length of the boundary between the first dielectric layer 110*a* and the second dielectric layer 110*b* having the different dielectric constants may be increased by the first cavity 121, and accordingly, the gain of the second antenna 100*b* may be increased by changing the radiation pattern of the second antenna 100*b*.

Figure 3:
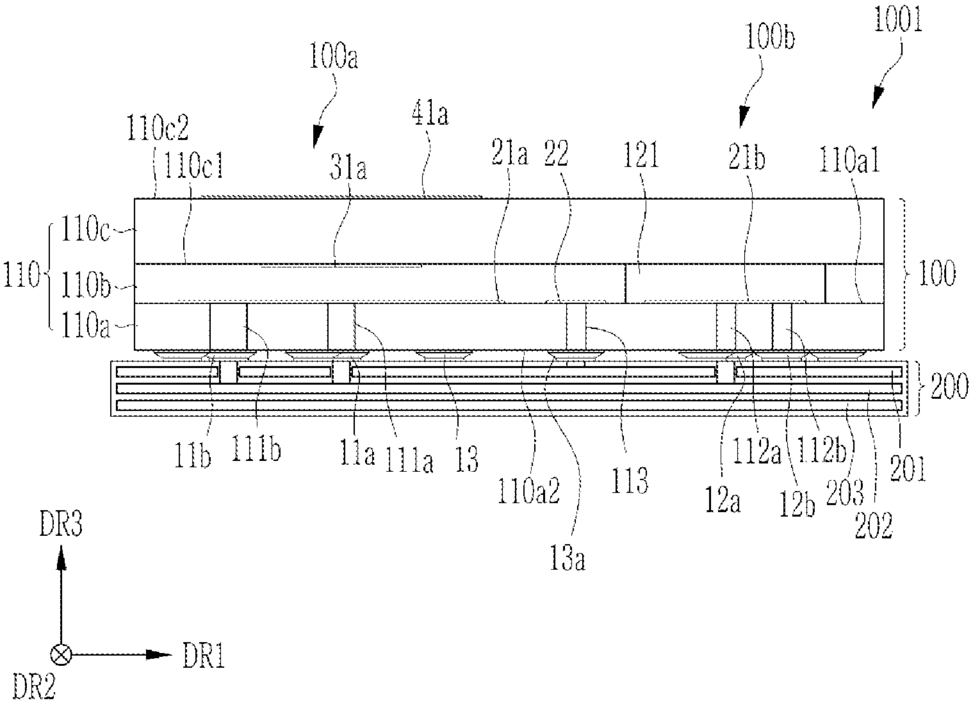
FIG. 3 is a cross-sectional view of an antenna device according to another embodiment.

The antenna device 1001, according to another embodiment, is described with reference to FIG. 3 and FIG. 4. FIG. 3 is a cross-sectional view of an antenna device according to another embodiment, and FIG. 4 is a top plan view of an antenna device of FIG. 3.

Figure 4:
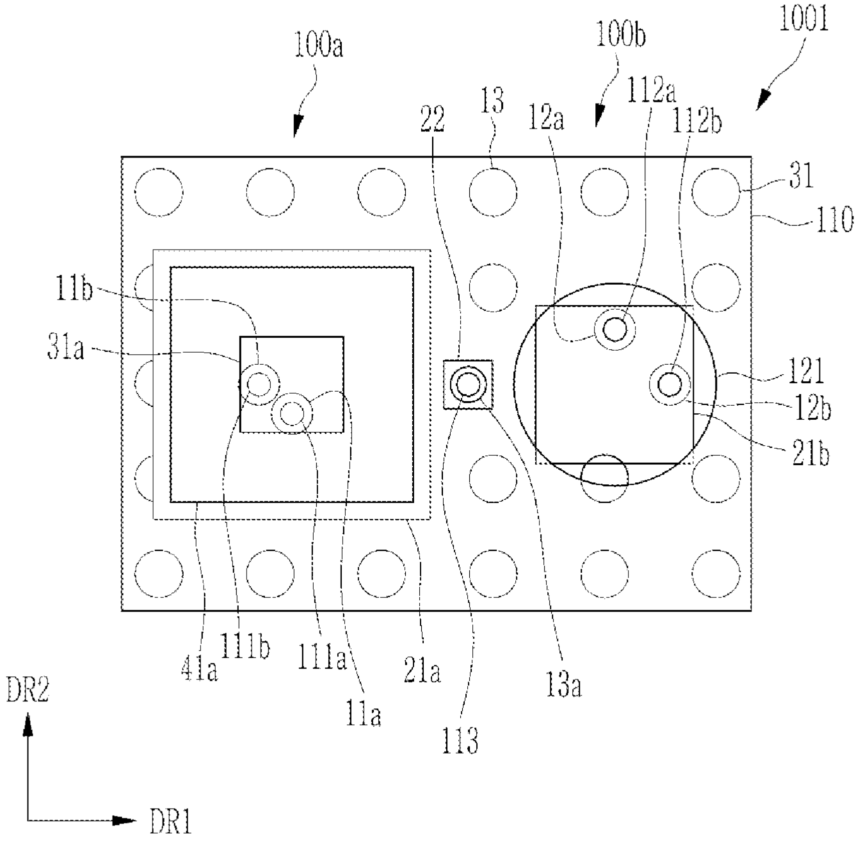
FIG. 4 is a top plan view of an antenna device of FIG. 3.

Referring to FIG. 3 and FIG. 4, the antenna device 1001, according to the present embodiment, is similar to the antenna device 1000, according to the embodiments described above. Therefore, the detailed description of the same constituent elements is omitted.

The antenna device 1001, according to the present embodiment, may include the first antenna 100*a* and the second antenna 100*b*, and the first antenna 100*a* and the second antenna 100*b* may include the dielectric layer 110, the feed vias 111*a*, 111*b*, 112*a*, and 112*b* and the antenna patches 21*a*, 21*b*, 31*a*, and 41*a* disposed in the dielectric layer 110, and the connections 11*a*, 11*b*, 12*a*, 12*b*, 13, and 13*a* disposed under the dielectric layer 110.

The first antenna 100*a* may include the first feed via 111*a* and the second feed via 111*b* penetrating the first dielectric layer 110*a*, the first antenna patch 21*a* disposed in the first surface 110*a*1 of the first dielectric layer 110*a*, the second antenna patch 31*a* facing the first antenna patch 21*a* and disposed in the first surface 110*c*1 of the third dielectric layer 110*c*, and the third antenna patch 41*a* disposed in the second surface 110*c*2 of the third dielectric layer 110*c* and overlapping the first antenna patch 21*a* and the second antenna patch 31*a* according to the third direction DR3.

The first antenna patch 21*a* may be fed from the first feed via 111*a* and the second feed via 111*b*. The first antenna patch 21*a* may be a feed patch.

The second antenna patch 31*a* and the third antenna patch 41*a* may be electromagnetically coupled to the first antenna patch 21*a*, and may be radiating patches.

The second antenna 100*b* may include the third feed via 112*a* and the fourth feed via 112*b* passing through the first dielectric layer 110*a*, and the fourth antenna patch 21*b* disposed in the first surface 110*a*1 of the first dielectric layer 110*a*.

The second dielectric layer 110*b* may have the first cavity 121 overlapping the fourth antenna patch 21*b* of the second antenna 100*b*, and may increase the gain of the second antenna 100*b* by changing the radiation pattern of the second antenna 100*b* by adjusting the dielectric constant of the interface in the dielectric layer 110 of the second antenna 100*b*.

The antenna device 1001, according to the present embodiment, may further include a shield pattern 22 disposed between the first antenna 100*a* and the second antenna 100*b* and a shield via 113 connected to the shield pattern 22.

The shield via 113 and the shield pattern 22 may be connected to the ground plane 201.

The shield pattern 22 is disposed between the first antenna patch 21*a* of the first antenna 100*a* and the fourth antenna patch 21*b* of the second antenna 100*b* to increase the degree of the isolation between the first antenna 100*a* and the second antenna 100*b*.

Among a plurality of connections 11*a*, 11*b*, 12*a*, 12*b*, 13, and 13*a*, the first connection 11*a* and the second connection 11*b* may be connected to the first feed via 111*a* and the second feed via 111*b*, and the third connection 12*a* and the fourth connection 12*b* may be connected to the third feed via 112*a* and the fourth feed via 112*b*. A plurality of fifth connections 13 may be attached to the first dielectric layer 110*a*, the sixth connection 13*a* may be connected to the shield via 113, and the shield via 113 may be connected to the ground plane 201 through the sixth connection 13*a*.

The antenna device 1001 may further include a connection substrate 200 disposed under the antenna 100, and the antenna 100 may be connected to the connection substrate 200 through a plurality of connections 11*a*, 11*b*, 12*a*, 12*b*, 13, and 13*a*.

The connection substrate 200 may include a ground plane 201 and a plurality of metal layers 202 and 203.

The first antenna 100*a* may transmit and receive the first polarized RF signal of the first bandwidth according to the electromagnetic signal fed through the first feed via 111*a*, and the first antenna 100*a* may receive the second polarized RF signal of the first bandwidth RF signal according to the electromagnetic signal fed through the second feed via 111*b*.

The second antenna 100*b* may transmit/receive the first polarized RF signal of the second bandwidth according to the electromagnetic signal fed through the third feed via 112*a*, and may transmit/receive the second polarized RF signal of the second bandwidth according to the electromagnetic signal fed through the fourth feed via 112*b*.

The center frequency of the first bandwidth may be lower than the center frequency of the second bandwidth, the first polarization wave may be the horizontal polarization wave, and the second polarization wave may be the vertical polarization wave. For example, the range of the first bandwidth may be about 24 GHz to about 30 GHz, and the range of the second bandwidth may be about 37 GHz to about 50 GHz.

According to the antenna device 1001 according to the present embodiment, as the first antenna 100*a* and the second antenna 100*b* that transmit and receive the RF signals of the different bandwidths may be formed together by using the same dielectric layer 110 to position them next to each other along the first direction DR1, which is the horizontal direction, compared to the case of integrating the dual band antenna in the vertical direction, the structure of the antenna 100 is not complicated, so the manufacturing process is easy, and compared to the case of separately forming two antennas with the different bandwidths, the manufacturing process is not complicated, so the manufacturing cost may be lowered.

The antenna device 1001, according to the present embodiment, further includes the shield via 113 connected to the shield pattern 22 and the shield pattern 22 is disposed between the first antenna 100*a* and the second antenna 100*b*, so the degree of the isolation between the first antenna 100*a* and the second antenna 100*b* may increase.

According to the embodiment described above, many features of the antenna device 1000 apply to the antenna device 1001 according to the present embodiment.

Figure 5:
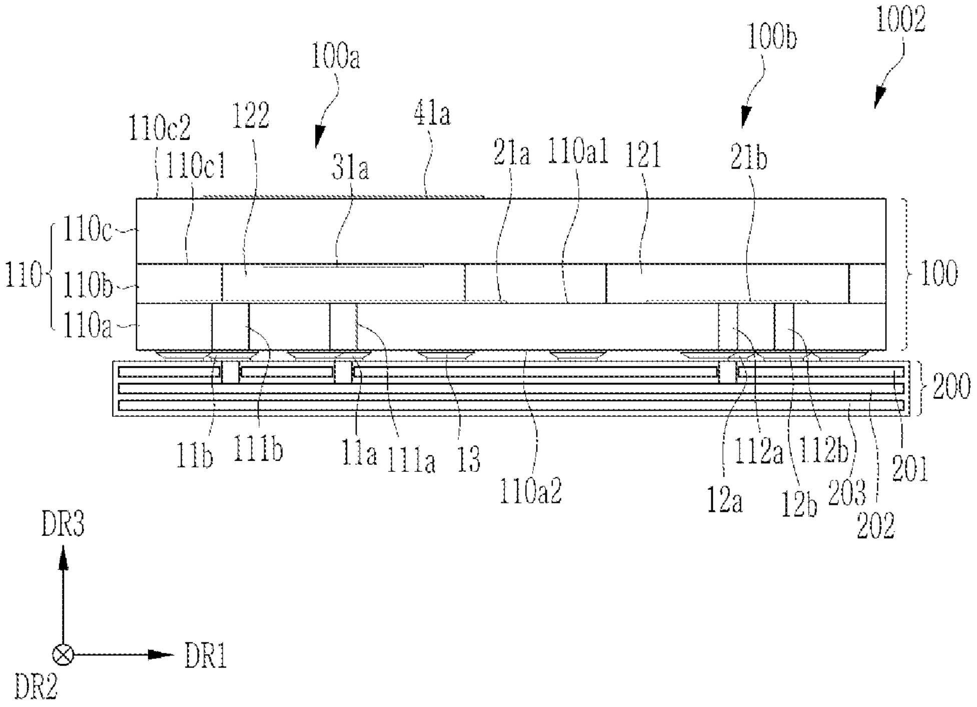
FIG. 5 is a cross-sectional view of an antenna device according to another embodiment.

The antenna device 1002, according to another embodiment, is described with reference to FIG. 5 and FIG. 6. FIG. 5 is a cross-sectional view of an antenna device according to another embodiment, and FIG. 6 is a top plan view of an antenna device of FIG. 5.

Figure 6:
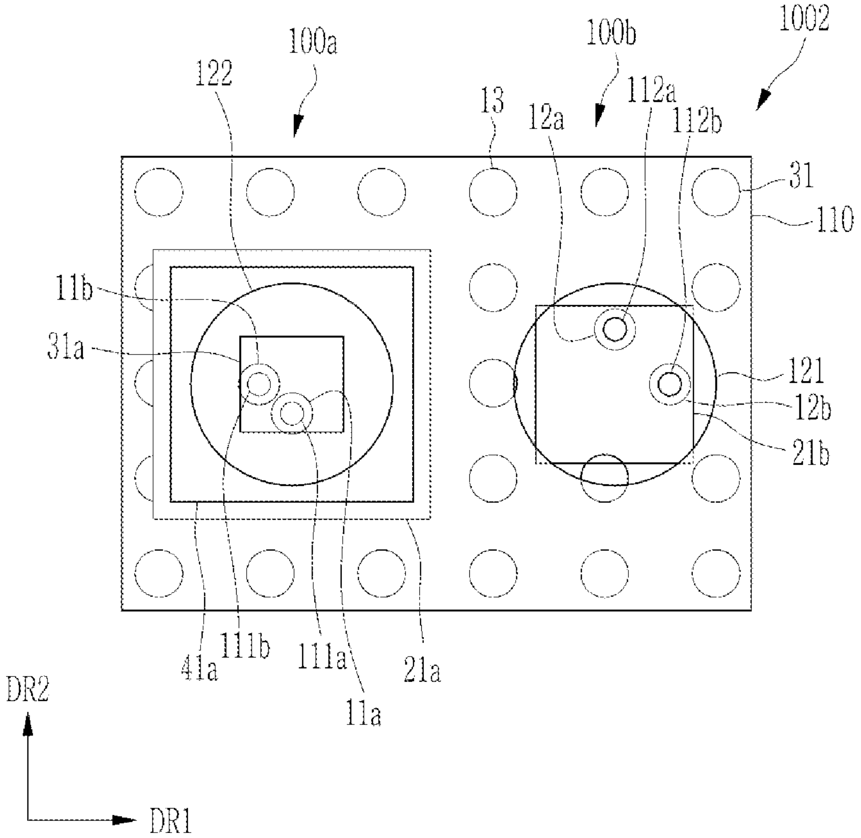
FIG. 6 is a top plan view of an antenna device of FIG. 5.

Referring to FIG. 5 and FIG. 6, the antenna device 1002, according to the present embodiment, is similar to the antenna devices 1000 and 1001 according to the embodiments described above. The detailed description of the same constituent elements is omitted.

The antenna device 1002, according to the present embodiment, includes the first antenna 100*a* and the second antenna 100*b*, and the first antenna 100*a* and the second antenna 100*b* may include the dielectric layer 110, and the feed vias 111*a*, 111*b*, 112*a*, and 112*b* and the antenna patches 21*a*, 21*b*, 31*a*, and 41*a* disposed in the dielectric layer 110 and a plurality of connections 11*a*, 11*b*, 12*a*, 12*b*, and 13 disposed under the dielectric layer 110.

The first antenna 100*a* may include the first feed via 111*a* and the second feed via 111*b* passing through the first dielectric layer 110*a*, the first antenna patch 21*a* disposed in the first surface 110*a*1 of the first dielectric layer 110*a*, the second antenna patch 31*a* facing the first antenna patch 21*a* and disposed in the first surface 110*c*1 of the third dielectric layer 110*c*, and the third antenna patch 41*a* disposed in the second surface 110*c*2 of the third dielectric layer 110*c* and overlapping the first antenna patch 21*a* and the second antenna patch 31*a* along the third direction DR3.

The first antenna patch 21*a* may be fed from the first feed via 111*a* and the second feed via 111*b*. The first antenna patch 21*a* may be a feed patch.

The second antenna patch 31*a* and the third antenna patch 41*a* may be electromagnetically coupled to the first antenna patch 21*a*, and may be radiating patches.

The second antenna 100*b* may include the third feed via 112*a* and the fourth feed via 112*b* passing through the first dielectric layer 110*a*, and the fourth antenna patch 21*b* disposed in the first surface 110*a*1 of the first dielectric layer 110*a*.

The second dielectric layer 110*b* may have the first cavity 121 that overlaps with the fourth antenna patch 21*b* of the second antenna 100*b*, and may greatly increase the gain of the second antenna 100*b* by adjusting the dielectric constant of the interface in the dielectric layer 110 of the second antenna 100*b* to change the radiation pattern of the second antenna 100*b*.

According to the present embodiment, the second dielectric layer 110*b* of the antenna device 1002 may further have the second cavity 122 overlapping the first antenna patch 21*a* of the first antenna 100*a*.

The second cavity 122 of the second dielectric layer 110*b* may change the radiation pattern of the first antenna 100*a* by adjusting the dielectric constant interface in the dielectric layer 110 of the first antenna 100*a* to increase the gain of the first antenna 100*a*.

Among a plurality of connections 11*a*, 11*b*, 12*a*, 12*b*, and 13, the first connection 11*a* and the second connection 11*b* may be connected to the first feed via 111*a* and the second feed via 111*b*, and the third connection 12*a* and the fourth connection 12*b* may be connected to the third feed via 112*a* and the fourth feed via 112*b*. A plurality of fifth connections 13 may be attached to the first dielectric layer 110*a*.

The antenna device 1002 may further include the connection substrate 200 disposed under the antenna 100, and the antenna 100 may be connected to the connection substrate 200 through a plurality of connections 11*a*, 11*b*, 12*a*, 12*b*, and 13.

The connection substrate 200 may include a ground plane 201 and a plurality of metal layers 202 and 203.

The first antenna 100*a* may transmit/receive the first polarized RF signal of the first bandwidth according to the electromagnetic signal fed through the first feed via 111*a*, and the first antenna 100*a* may transmit/receive the second polarized RF signal of the first bandwidth RF signal according to the electromagnetic signal fed through the second feed via 111*b*.

The second antenna 100*b* may transmit/receive the first polarized RF signal of the second bandwidth according to the electromagnetic signal fed through the third feed via 112*a*, and transmit/receive the second polarized RF signal of the second bandwidth according to the electromagnetic signal fed through the fourth feed via 112*b*.

The center frequency of the first bandwidth may be lower than the center frequency of the second bandwidth, the first polarization wave may be a horizontally polarized wave, and the second polarization may be a vertically polarized wave. For example, the range of the first bandwidth may be about 24 GHz to about 30 GHz, and the range of the second bandwidth may be about 37 GHz to about 50 GHz.

According to the antenna device 1002 according to the present embodiment, since the first antenna 100*a* and the second antenna 100*b* that transmit and receive the RF signals of the different bandwidths may be formed together using the same dielectric layer 110 to position them next to each other along the first direction DR1, which is the horizontal direction, compared to the case of integrating the dual band antenna in the vertical direction, the structure of the antenna 100 is not complicated, so the manufacturing process is easy, and compared to the case of separately forming two antennas with the different bandwidths, the manufacturing process is not complicated, so the manufacturing cost may be lowered.

The second dielectric layer 110*b* of the antenna device 1002, according to the present embodiment, may further have the second cavity 122 overlapping the first antenna patch 21*a* of the first antenna 100*a*, and the second cavity 122 of the second dielectric layer 110*b* may change the radiation pattern of the first antenna 100*a* by adjusting the dielectric constant of the interface in the dielectric layer 110 of the first antenna 100*a* to increase the gain of the first antenna 100*a*.

According to the embodiments described above, many features of the antenna devices 1000 and 1001 are applicable to the antenna device 1002 according to the present embodiment.

Figure 7:
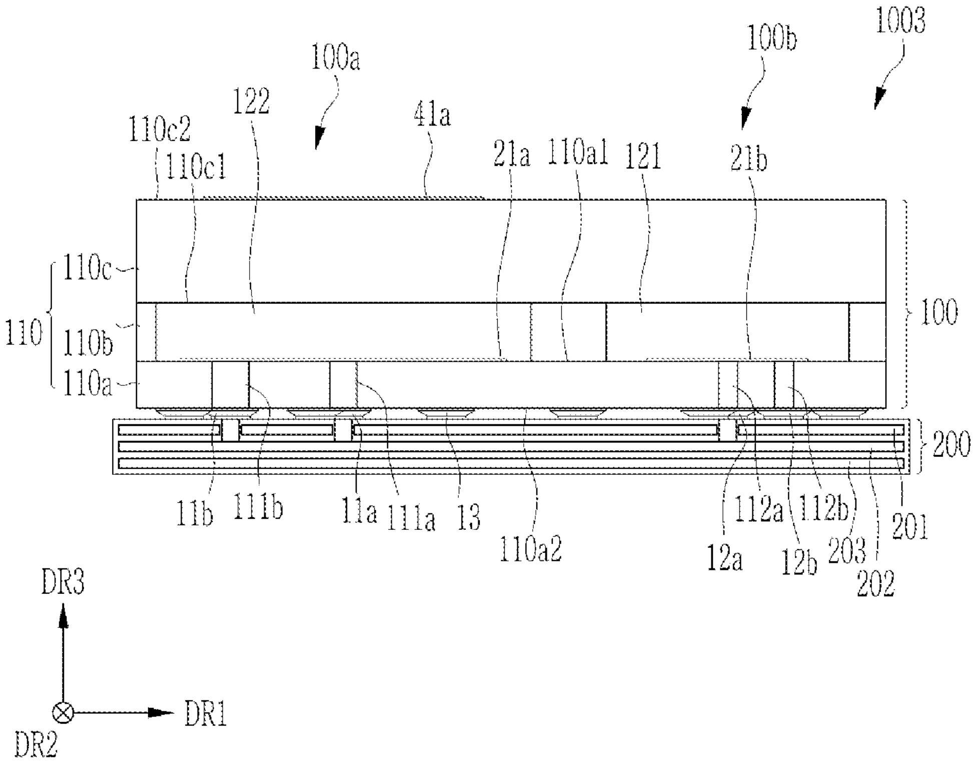
FIG. 7 is a cross-sectional view of an antenna device according to another embodiment.

The antenna device 1003, according to another embodiment, is described with reference to FIG. 7 and FIG. 8. FIG. 7 is a cross-sectional view of an antenna device according to another embodiment, and FIG. 8 is a top plan view of an antenna device of FIG. 7.

Figure 8:
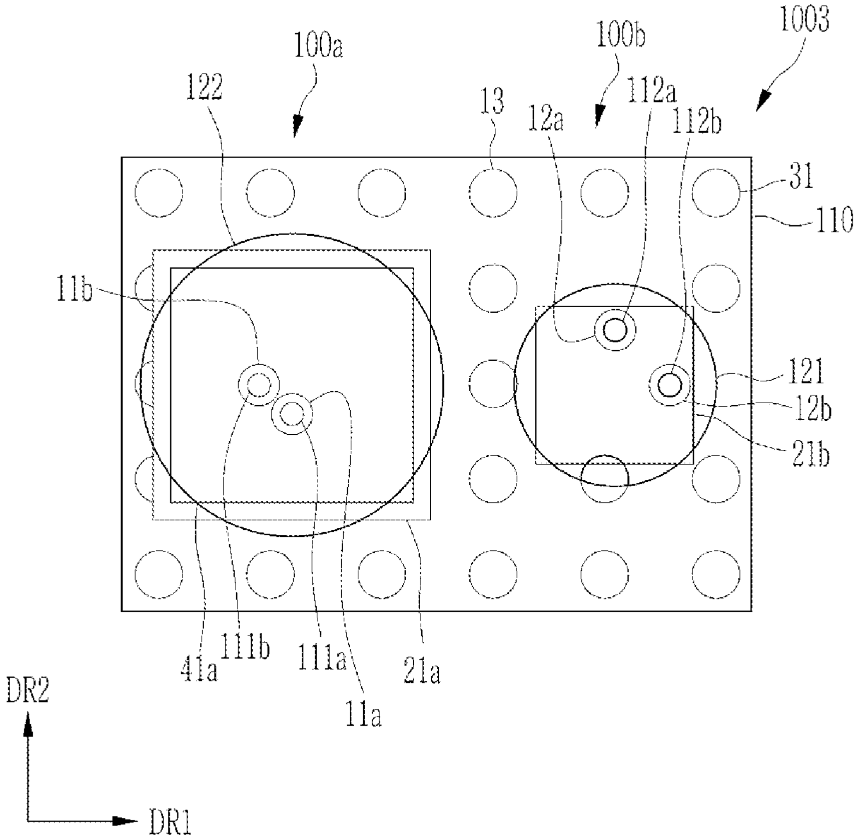
FIG. 8 is a top plan view of an antenna device of FIG. 7.

Referring to FIG. 7 and FIG. 8, the antenna device 1003, according to the present embodiment, is similar to the antenna devices 1000, 1001, and 1002 according to the embodiments described above. The detailed description of the same constituent elements is omitted.

The antenna device 1003, according to the present embodiment, includes the first antenna 100*a* and the second antenna 100*b*, and the first antenna 100*a* and the second antenna 100*b* may include the dielectric layer 110, and the feed vias 111*a*, 111*b*, 112*a*, and 112*b* and the antenna patches 21*a*, 21*b*, and 41*a* disposed in the dielectric layer 110, and a plurality of connections 11*a*, 11*b*, 12*a*, 12*b*, and 13 disposed under the dielectric layer 110.

The first antenna 100*a* may include the first feed via 111*a* and the second feed via 111*b* passing through the first dielectric layer 110*a*, the first antenna patch 21*a* disposed in the first surface 110*a*1 of the first dielectric layer 110*a*, and the third antenna patch 41*a* disposed in the second surface 110*c*2 of the third dielectric layer 110*c* and overlapping the first antenna patch 21*a* along the third direction DR3. Unlike the antenna devices 1000, 1001, and 1002 according to the above-described embodiments, in the antenna device 1003, according to the present embodiment, the second antenna patch 31*a* is disposed in the first surface 110*c*1 of the third dielectric layer 110*c*.

The first antenna patch 21*a* may be fed from the first feed via 111*a* and the second feed via 111*b*. The first antenna patch 21*a* may be a feed patch, and the third antenna patch 41*a* may be electromagnetically coupled to the first antenna patch 21*a* and may be a radiating patch.

The second antenna 100*b* may include the third feed via 112*a* and the fourth feed via 112*b* passing through the first dielectric layer 110*a*, and the fourth antenna patch 21*b* disposed on the first surface 110*a*1 of the first dielectric layer 110*a*.

The second dielectric layer 110*b* may have the first cavity 121 that overlaps with the fourth antenna patch 21*b* of the second antenna 100*b*, and may greatly increase the gain of the second antenna 100*b* by adjusting the dielectric constant of the interface in the dielectric layer 110 of the second antenna 100*b* to change the radiation pattern of the second antenna 100*b*.

The second dielectric layer 110*b* may have the second cavity 122 overlapping the first antenna patch 21*a* of the first antenna 100*a*, and the second cavity 122 of the second dielectric layer 110*b* may change the radiation pattern of the first antenna 100*a* by adjusting the dielectric constant of the interface in the dielectric layer 110 of the first antenna 100*a* to increase the gain of the first antenna 100*a*. The second cavity 122 of the antenna device 1003 according to the present embodiment may be larger than the second cavity 122 of the antenna device 1002 according to the embodiment shown in FIG. 5 and FIG. 6.

The thickness of the third dielectric layer 110*c* and the thickness of the second dielectric layer 110*b* of the antenna device 1003, according to the present embodiment, may be greater than the thickness of the third dielectric layer 110*c* and the second dielectric layer 110*b* of the antenna device 1002 according to the embodiment shown in FIG. 5 and FIG. 6.

By increasing the thickness of the third dielectric layer 110*c*, the entire dielectric constant of the dielectric layer 110 may be lowered, and as the dielectric constant of the dielectric layer 110 becomes smaller, the gain of the first antenna 100*a* may not decrease even if the second antenna patch 31*a* is omitted.

In addition, by increasing the thickness of the second dielectric layer 110*b*, it is possible to increase the straightness of the propagation direction transmitted from the first antenna patch 21*a* to the third antenna patch 41*a* disposed on the second surface 110*c*2 of the third dielectric layer 110*c*, and accordingly, even if the second antenna patch 31*a* is omitted, the gain of the first antenna 100*a* may not decrease.

The size of the third antenna patch 41*a* of the antenna device 1003, according to the present embodiment, may be different from the size of the third antenna patch 41*a* of the antenna device 1002, according to the embodiment shown in FIG. 5 and FIG. 6. To obtain the desired frequency of the first antenna 100*a*, the size of the third antenna patch 41*a* may be changed according to the thickness of the third dielectric layer 110*c* and the thickness of the second dielectric layer 110*b*.

Among a plurality of connections 11*a*, 11*b*, 12*a*, 12*b*, and 13, the first connection 11*a* and the second connection 11*b* may be connected to the first feed via 111*a* and the second feed via 111*b*, and the third connection 12*a* and the fourth connection 12*b* may be connected to the third feed via 112*a* and the fourth feed via 112*b*. A plurality of fifth connections 13 may be attached to the first dielectric layer 110*a*.

The antenna device 1003 may further include the connection substrate 200 disposed under the antenna 100, and the antenna 100 may be connected to the connection substrate 200 through a plurality of connections 11*a*, 11*b*, 12*a*, 12*b*, and 13.

The connection substrate 200 may include a ground plane 201 and a plurality of metal layers 202 and 203.

The first antenna 100*a* may transmit/receive the first polarized RF signal of the first bandwidth according to the electromagnetic signal fed through the first feed via 111*a*, and the first antenna 100*a* may transmit/receive the second polarized RF signal of the first bandwidth RF signal according to the electromagnetic signal fed through the second feed via 111*b*.

The second antenna 100*b* may transmit/receive the first polarized RF signal of the second bandwidth according to the electromagnetic signal fed through the third feed via 112*a*, and may transmit/receive the second polarized RF signal of the second bandwidth according to the electromagnetic signal fed through the fourth feed via 112*b*.

The center frequency of the first bandwidth may be lower than the center frequency of the second bandwidth, the first polarization wave may be a horizontally polarized wave, and the second polarization may be a vertically polarized wave. For example, the range of the first bandwidth may be about 24 GHz to about 30 GHz, and the range of the second bandwidth may be about 37 GHz to about 50 GHz.

According to the antenna device 1003 according to the present embodiment, since the first antenna 100*a* and the second antenna 100*b* that transmit and receive the RF signals of the different bandwidths may be formed together by using the same dielectric layer 110 to position them next to each other along the first direction DR1, which is the horizontal direction, compared to the case of integrating the dual band antenna in the vertical direction, the structure of the antenna 100 is not complicated, so the manufacturing process is easy, and compared to the case of separately forming two antennas with the different bandwidths, the manufacturing process is not complicated, so the manufacturing cost may be lowered.

The second dielectric layer 110*b* of the antenna device 1003, according to the present embodiment, may further have the second cavity 122 overlapping the first antenna patch 21*a* of the first antenna 100*a*, and the second antenna patch 31*a* disposed on the first surface 110*c*1 of the third dielectric layer 110*c* may be omitted.

The second cavity 122 of the antenna device 1003, according to the present embodiment, may be larger than the second cavity 122 of the antenna device 1002 according to the embodiment shown in FIG. 5 and FIG. 6, and the thickness of the third dielectric layer 110*c* and the thickness of the second dielectric layer 110*b* of the antenna device 1003 according to the present embodiment may be greater than the thickness of the third dielectric layer 110*c* and the thickness of the second dielectric layer 110*b* of the antenna device 1002 according to the embodiment shown in FIG. 5 and FIG. 6. As such, by adjusting the size of the second cavity 122, the thickness of the third dielectric layer 110*c*, and the thickness of the second dielectric layer 110*b*, the gain of the first antenna 100*a* may be increased even if the second antenna patch 31*a* is omitted.

In addition, the size of the third antenna patch 41*a* of the antenna device 1003, according to the present embodiment, may be different from the size of the third antenna patch 41*a* of the antenna device 1002, according to the embodiment shown in FIG. 5 and FIG. 6. As such, by changing the size of the third antenna patch 41*a* according to the thickness of the third dielectric layer 110*c* and the thickness of the second dielectric layer 110*b*, the desired frequency of the first antenna 100*a* may be obtained.

Many features of the antenna devices 1000, 1001, and 1002 according to the embodiments described above, apply to the antenna device 1003 according to the present embodiment.

Figure 9:
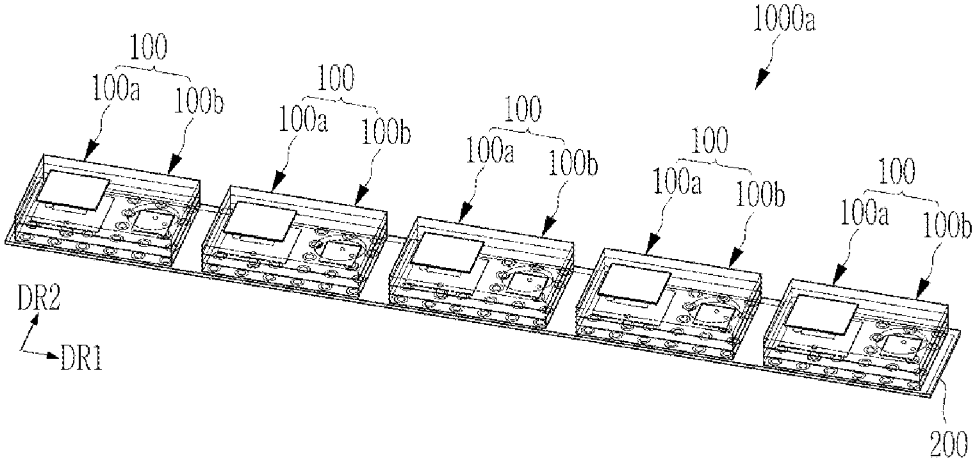
FIG. 9 is a perspective view of an antenna device according to an embodiment.

The antenna device, including a plurality of antennas according to an embodiment, is described with reference to FIG. 9 along with FIG. 1 to FIG. 8. FIG. 9 is a perspective view of an antenna device according to an embodiment.

An antenna device 1000*a*, according to the present embodiment, may include a plurality of antennas 100 disposed along the first direction DR1.

Each antenna 100 may be similar to the antenna 100 according to the embodiments previously described with reference to FIG. 1 to FIG. 8. A plurality of antennas 100 may be attached to one connection substrate 200 and may be connected to one electronic device (not shown) to receive an electrical signal.

As described above, since each antenna 100 includes the first antenna 100*a* and the second antenna 100*b*, compared to the case of separately attaching two antennas of the different bandwidths, the antenna device 1000*a*, according to the present embodiment, may reduce the number of antenna chips attached to the connection substrate 200 by half while implementing the multi-band.

The characteristics of the antenna devices 1000, 1001, 1002, and 1003 according to the embodiments described above are applicable to the antenna device 1000*a*, including a plurality of antennas according to the present embodiment.

Figure 10:
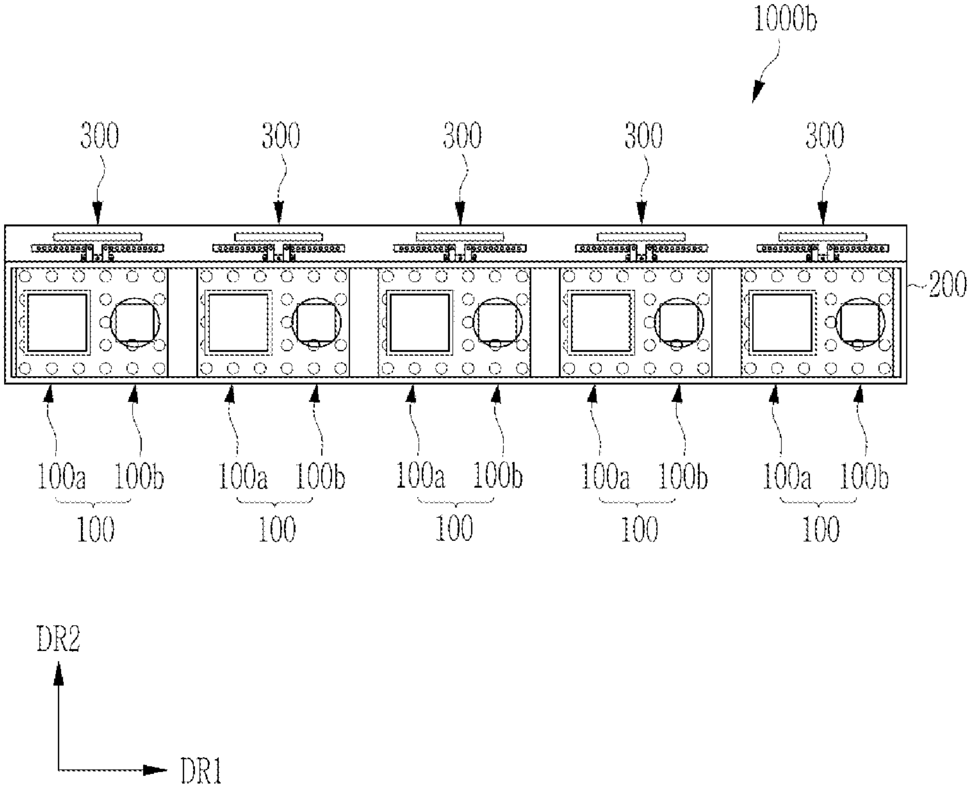
FIG. 10 is a top plan view of an antenna device according to an embodiment.

The antenna device, including a plurality of antennas according to an embodiment, is described with reference to FIG. 10 along with FIG. 1 to FIG. 8. FIG. 10 is a perspective view of an antenna device according to an embodiment.

The antenna device 1000*b*, according to the present embodiment, may further include a plurality of antennas 100 disposed along the first direction DR1 and a plurality of end-fire antennas 300 connected to a plurality of antennas 100 along the second direction DR2.

Each antenna 100 of the antenna device 1000*b*, according to the present embodiment, may be similar to the antenna 100 according to the embodiments described with reference to FIG. 1 to FIG. 8 above. A plurality of antennas 100 and a plurality of end-fire antennas 300 may be attached on one connection substrate 200 and may be connected to one electronic device (not shown) to receive an electrical signal.

As described above, since each antenna 100 includes the first antenna 100*a* and the second antenna 100*b*, compared to the case of separately attaching two antennas of the different bandwidths, the antenna device 1000*a* according to the present embodiment may reduce the number of antenna chips attached to the connection substrate 200 by half while implementing the multi-band.

A plurality of end-fire antennas 300 may further form a radiation pattern of the RF signal in the first direction DR1 and the second direction DR2 that are horizontal directions.

The characteristics of the antenna devices 1000, 1001, 1002, 1003, and 1000*a*, according to the embodiments described above, are all applicable to the antenna device 1000*b*, including a plurality of antennas according to the present embodiment.

Figure 11:
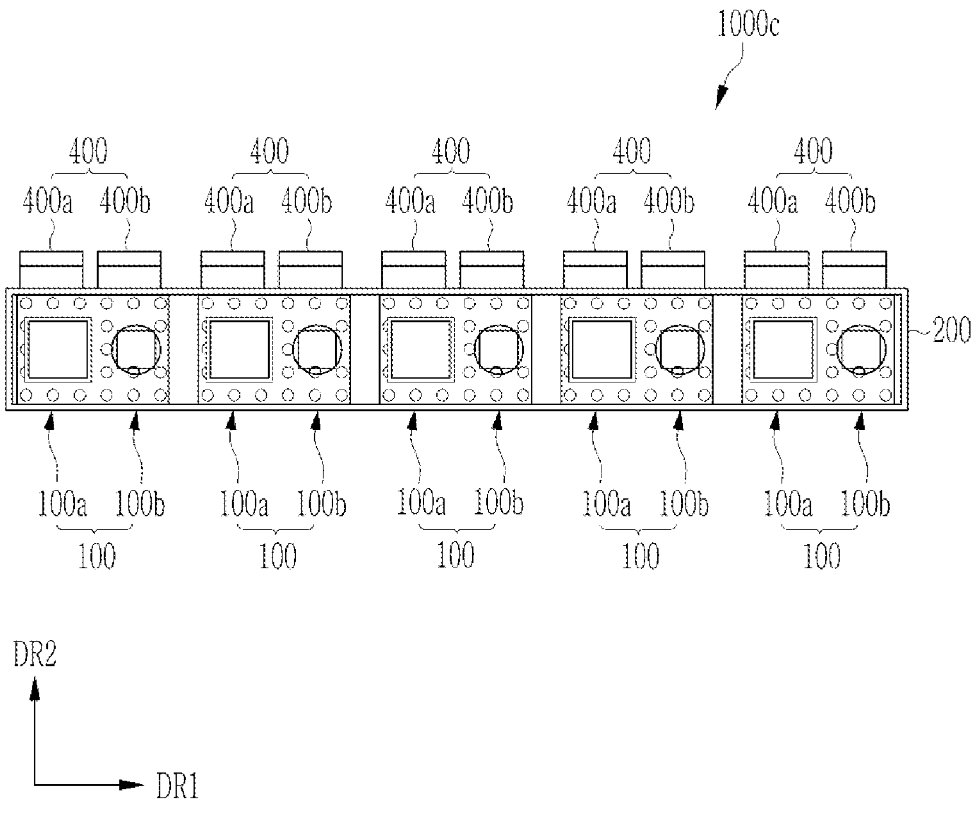
FIG. 11 is a top plan view of an antenna device according to an embodiment.

The antenna device, including a plurality of antennas according to an embodiment, is described with reference to FIG. 11 along with FIG. 1 to FIG. 8. FIG. 11 is a perspective view of an antenna device according to an embodiment.

The antenna device 1000*c*, according to the present embodiment, may further include a plurality of antennas 100 that are disposed along the first direction DR1 and a plurality of end-fire antennas 400 connected to a plurality of antennas 100.

Each antenna 100 of the antenna device 1000*c*, according to the present embodiment, may be similar to the antenna 100 according to the embodiments described with reference to FIG. 1 to FIG. 8 above. A plurality of antennas 100 and a plurality of end-fire antennas 400 may be attached on one connection substrate 200 and may be connected to one electronic device (not shown) to receive an electrical signal.

As described above, since each antenna 100 includes the first antenna 100*a* and the second antenna 100*b*, compared to the case of separately attaching two antennas of the different bandwidths, the antenna device 1000*a*, according to the present embodiment, may reduce the number of antenna chips attached to the connection substrate 200 by half while implementing the multi-band.

Each end-fire antenna 400 may include a first portion 400*a* and a second portion 400*b* formed in the form of a chip.

The first portion 400*a* and the second portion 400*b* of each end-fire antenna 400 may include a radiator and a dielectric material.

A plurality of end-fire antennas 400 may further form a radiation pattern of the RF signal in the first direction DR1, and the second direction DR2 that are horizontal directions.

The characteristics of the antenna devices 1000, 1001, 1002, 1003, 1000*a*, and 1000*b*, according to the embodiments described above, are applicable to the antenna device 1000*c*, including a plurality of antennas according to the present embodiment.

Figure 12:
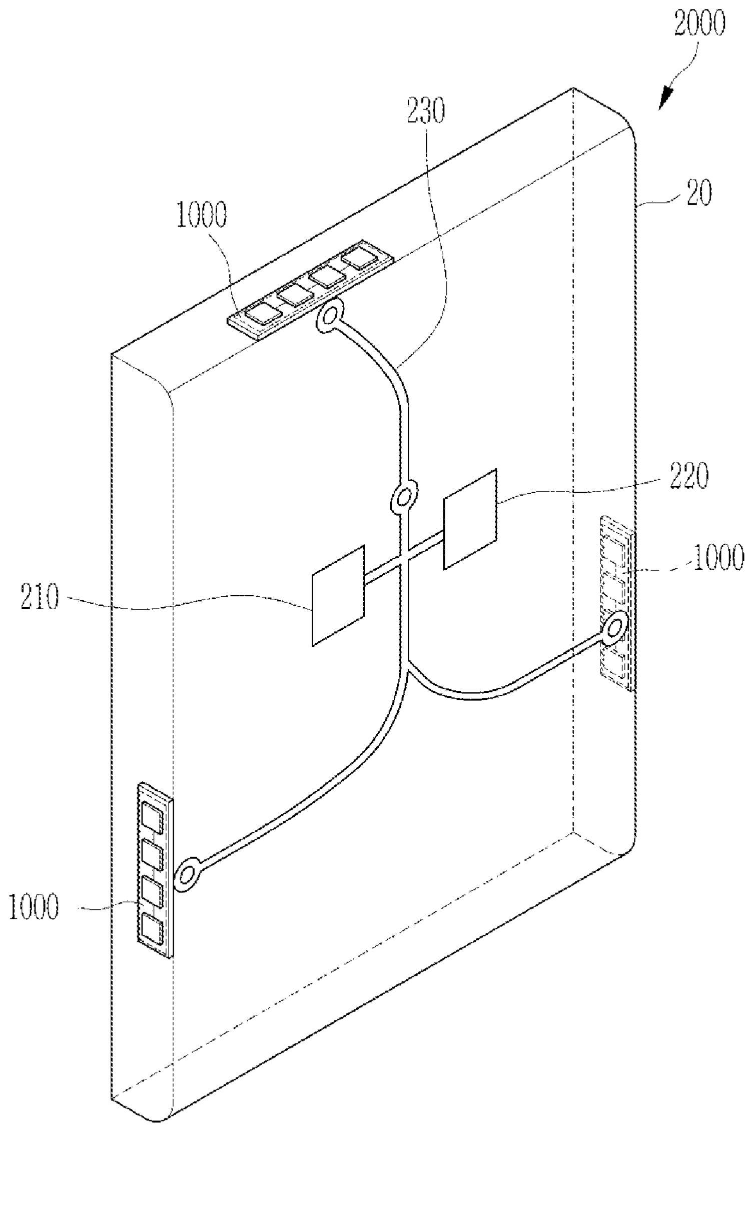
FIG. 12 is a perspective view of an electronic device, including an antenna device according to an embodiment.

An electronic device, including the antenna device according to an embodiment, is described with reference to FIG. 12 along with FIG. 1 to FIG. 11. FIG. 12 is a perspective view of an electronic device, including an antenna device, according to an embodiment.

The electronic device 2000, according to the embodiment, includes the antenna device 1000, and the antenna device 1000 is disposed to a set 20 of the electronic device 2000.

The electronic device 2000 may be a smart phone, a personal digital assistant, a digital video camera, a digital still camera, a network system, a computer, a monitor, a tablet, a laptop, a netbook, a television, a video game, a smart watch, an automotive part, and the like, but it is not limited thereto.

The electronic device 2000 may have polygonal sides, and the antenna apparatus 1000 may be disposed adjacent to at least a portion of a plurality of sides of the electronic device 2000.

A communication module 210 and a baseband circuit 220 may be disposed on the set 20, and the antenna apparatus 1000 may be electrically connected to the communication module 210 and the baseband circuit 220 through a coaxial cable 230.

The communication module 210 may include at least one among a memory chip such as a volatile memory (e.g., a DRAM), a non-volatile memory (e.g., a ROM), a flash memory to perform digital signal processing, an application processor chip such as a central processor (e.g., a CPU), a graphics processor (e.g., a GPU), a digital signal processor, an encryption processor, a microprocessor, a microcontroller, a logic chip such as an analog-digital converter, and an application-specific IC (ASIC).

The baseband circuit 220 may generate a base signal by performing analog-digital conversion, amplification of an analog signal, filtering, and frequency conversion. The base signal input and output from the baseband circuit 220 may be transmitted to the antenna apparatus through a cable. For example, the base signal may be transferred to an IC through an electrical connection structure, a core via, and wiring, and the IC may convert the base signal into an RF signal of a millimeter waveband.

Although not shown, each antenna apparatus 1000 may include a plurality of antennas 100, each antenna 100 may be similar to the antenna 100 according to the embodiment described with reference to FIG. 1 and FIG. 2, and each antenna device 1000 may be similar to the antenna devices 1000, 1001, 1002, 1003, 1000*a*, 1000*b*, and 1000*c* according to the embodiments described above.

Embodiments provide a multi-band antenna device that may be manufactured without complicating the manufacturing process.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An antenna device comprising:
a first dielectric layer;
a second dielectric layer disposed on the first dielectric layer;
a third dielectric layer disposed on the second dielectric layer;
a first antenna including a first feed via passing through the first dielectric layer and a first antenna patch disposed on a first surface of the first dielectric layer; and
a second antenna including a second feed via passing through the first dielectric layer and a second antenna patch disposed on the first surface of the first dielectric layer,
wherein a dielectric constant of the second dielectric layer is lower than a dielectric constant of the first dielectric layer and a dielectric constant of the third dielectric layer, and
the second dielectric layer has a cavity overlapping the second antenna patch.

2. The antenna device of claim 1, wherein
the dielectric constant of the third dielectric layer is higher than the dielectric constant of the first dielectric layer.

3. The antenna device of claim 2, wherein
the second dielectric layer comprises an adhesive material.

4. The antenna device of claim 3, wherein
the second dielectric layer includes a polymer.

5. The antenna device of claim 2, wherein
a thickness of the second dielectric layer is smaller than a thickness of the first dielectric layer and a thickness of the third dielectric layer.

6. The antenna device of claim 2, wherein
the first antenna further includes a third antenna patch overlapping the first antenna patch, and the third antenna patch is disposed on a first surface of the third dielectric layer, and
the first surface of the first dielectric layer and the first surface of the third dielectric layer face each other with the second dielectric layer interposed therebetween.

7. The antenna device of claim 6, wherein
the first antenna further includes a fourth antenna patch overlapping the first antenna patch, and the fourth antenna patch is disposed on a second surface of the third dielectric layer opposing the first surface of the third dielectric layer.

8. The antenna device of claim 7, wherein
an area of the third antenna patch and an area of the fourth antenna patch are smaller than an area of the first antenna patch.

9. The antenna device of claim 8, wherein
the area of the third antenna patch is smaller than the area of the fourth antenna patch.

10. The antenna device of claim 9, wherein
the area of the third antenna patch is smaller than an area of the second antenna patch.

11. The antenna device of claim 2, wherein
the first antenna is configured to transmit and receive an RF signal of a first bandwidth, and the second antenna is configured to transmit and receive an RF signal of a second bandwidth that is higher than the first bandwidth.

12. The antenna device of claim 2, further comprising
a plurality of connections disposed on a second surface of the first dielectric layer opposing the first surface of the first dielectric layer.

13. An antenna device comprising:
a first antenna including a first dielectric layer and a second dielectric layer, a third dielectric layer disposed between the first dielectric layer and the second dielectric layer, a first feed via passing through the first dielectric layer, a first feed patch disposed on the first dielectric layer, and a radiating patch disposed in the second dielectric layer; and
a second antenna including the first dielectric layer, the second dielectric layer, a second feed via passing through the first dielectric layer, a second feed patch disposed on the first dielectric layer, and a cavity formed in the third dielectric layer disposed on the second feed patch.

14. The antenna device of claim 13, wherein
the first antenna is configured to transmit and receive an RF signal of a first bandwidth, and the second antenna is configured to transmit and receive an RF signal of a second bandwidth that is higher than the first bandwidth.

15. The antenna device of claim 14, wherein
a dielectric constant of the third dielectric layer is lower than a dielectric constant of the first dielectric layer and a dielectric constant of the second dielectric layer, and
the third dielectric layer comprises an adhesive material.

16. The antenna device of claim 14, wherein
the dielectric constant of the second dielectric layer is higher than the dielectric constant of the first dielectric layer.

17. The antenna device of claim 14, wherein
the radiating patch includes:
a first radiating patch disposed in a first surface of the second dielectric layer to oppose the first feed patch with the third dielectric layer therebetween; and a second radiating patch disposed in a second surface of the second dielectric layer to oppose the first surface of the second dielectric layer.

18. The antenna device of claim 17, wherein a size of the first radiating patch is smaller than a size of the first feed patch and a size of the second radiating patch.

19. The antenna device of claim 14, wherein a size of the first feed patch is larger than a size of the second feed patch.

20. The antenna device of claim 14, further comprising a plurality of connections disposed under the first dielectric layer.

* * * * *